United States Patent [19]
Kierpaul et al.

[11] Patent Number: 5,934,444
[45] Date of Patent: Aug. 10, 1999

[54] TOTE TRANSPORT SYSTEM

[75] Inventors: Chester Felix Kierpaul, Westland; Ricky Lee Brown, Southfield; David Kenneth Meissner; Donald Lee Anderson, both of Brighton, all of Mich.

[73] Assignee: Jervis B. Webb Company, Farmington Hills, Mich.

[21] Appl. No.: 08/595,799

[22] Filed: Feb. 2, 1996

[51] Int. Cl.⁶ .................................................. B65G 37/00
[52] U.S. Cl. ..................... 198/580; 198/465.1; 198/465.4
[58] Field of Search ............................... 198/468.6, 358, 198/580, 803.01, 465.1, 465.4

[56] References Cited

U.S. PATENT DOCUMENTS

| | | | |
|---|---|---|---|
| 1,837,605 | 12/1931 | Baker | 198/580 |
| 3,648,819 | 3/1972 | Converse et al. | 198/19 |
| 3,695,462 | 10/1972 | Sullivan | 214/16 B |
| 3,776,395 | 12/1973 | Lingg et al. | 214/16 BA |
| 4,468,165 | 8/1984 | Kawasaki | 198/465.1 |
| 4,712,964 | 12/1987 | Van Eltren et al. | 198/458.6 |
| 4,720,228 | 1/1988 | Horiguchi | 198/465.1 |
| 4,917,227 | 4/1990 | Matsuo et al. | 198/465.1 |
| 5,203,445 | 4/1993 | Shiraiwa | 198/468.6 |
| 5,301,790 | 4/1994 | Prydtz et al. | 198/349 |
| 5,337,881 | 8/1994 | Kakida et al. | 198/468.6 |
| 5,351,801 | 10/1994 | Markin et al. | 198/465.1 |

FOREIGN PATENT DOCUMENTS 1234321  5/1984  U.S.S.R. .............................. 198/468.6

Primary Examiner—Kenneth Noland
Assistant Examiner—Khoi H. Tran
Attorney, Agent, or Firm—Dickinson Wright PLLC

[57] ABSTRACT

A tote conveyor system for transporting totes from an end-of-use point to the point-of-use. The conveyor system comprising a combination of conveyors including a vertical conveyor and a substantial horizontal conveyor with a means to transferring totes between the two different systems.

8 Claims, 4 Drawing Sheets

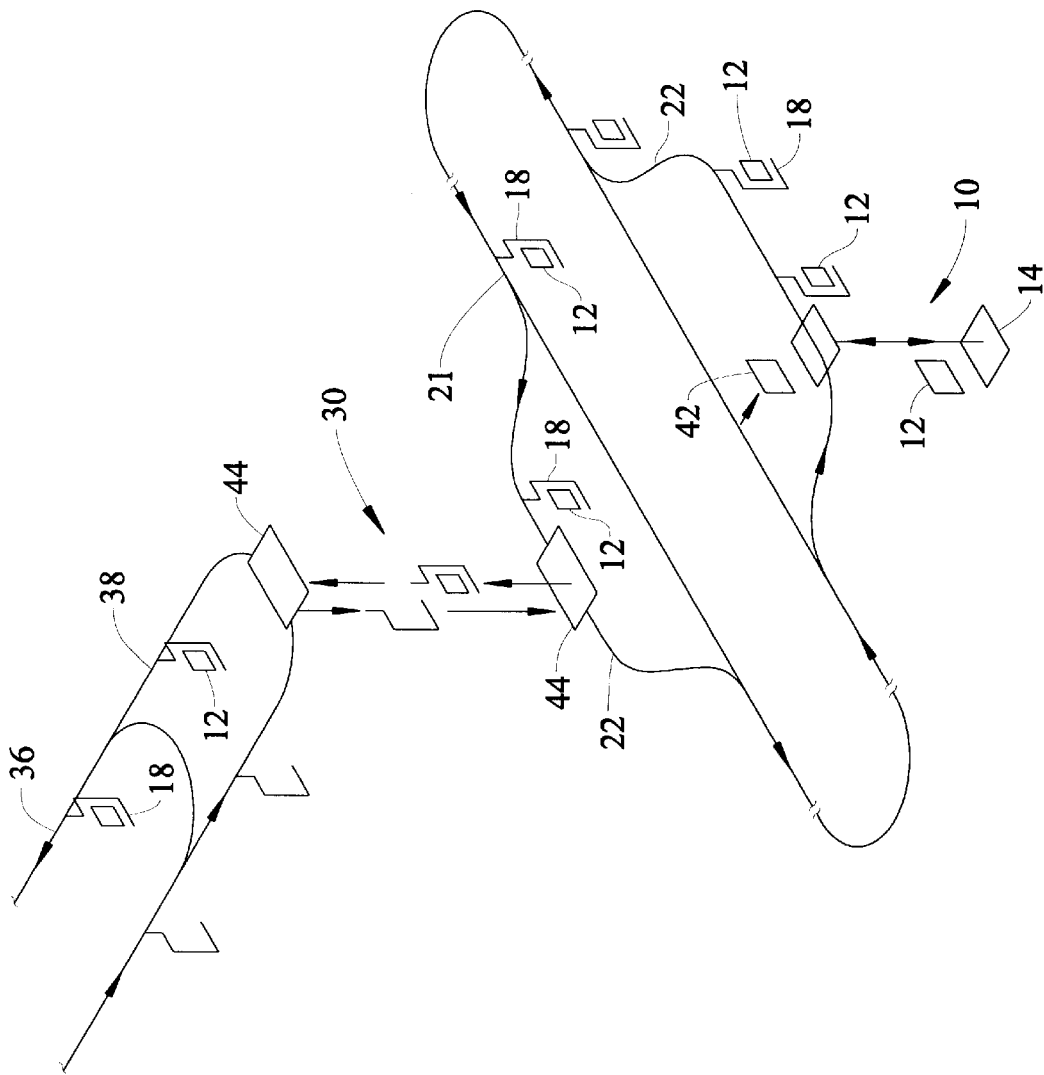

TOTE TRANSPORT SYSTEM

The present invention relates to an automatically operated conveyor system for returning totes to point-of-use. The system includes a control system, switches, conveyors, carriers, lifts and transfer stations and operates in a predetermined direction based on tote accumulation. More particularly, the invention relates to baggage handling facilities, such as the transportation and distribution of luggage in airports, using totes, pallets, containers and/or bins for transporting luggage on conveyor systems. For purposes of this document the terms "tote" or "totes" will be understood to be interchangeable with pallets, containers, bins, or other items suitable for this purpose.

The conventional luggage handling systems lack automation for return of luggage totes. A typical system will allow attendants at the check-in point, ticket booth, to retrieve a tote, stored at their station and place an item of luggage in the tote. Then the attendant will place the tote containing the luggage onto the conveyor system. The system will convey the tote to a make-up area typically several floors below the check-in area. At the make-up area a second attendant will remove the luggage from the tote and place the luggage onto a conventional ground cart and the tote onto a tote stack. When required, the attendant will place the stack of totes on a cart and return them to the initial check-in point. This lack of automatic return for the totes requires a supervisor to monitor the stack of totes and schedule periods for attendants to interrupt their duties and return the totes to the check-in area and distribute the totes to the various check-in points. These manual operations unnecessarily result, at a minimum, in interruptions of the attendants and exposes the delivery system to needless delays resulting from unavailability of totes.

There have been attempts to overcome this problem by installing automated tote return systems. There are numerous automated systems in the art such as the one described in U.S. Pat. No. 3,776,395 Lingg et al. which relates to a roller conveyor or belt conveyor system having a series of automated tote stacking and unstacking stations. The problem with this and other return systems whether they comprise their own system of conveyors or take advantage of the return runs of the loaded tote conveyors is that the arrangement of the return system typically does not handle empty totes well—much less stacked empty totes. In addition, these systems typically require too much valuable building space. These handling and space problems are compounded in systems required to return totes to locations on different floors of a facility.

We have surprisingly reduced or substantially overcome one or more of the aforementioned problems.

SUMMARY OF THE INVENTION

This invention relates to an automated system for returning totes from an end-of-use point, reclaim area, back to a point-of-use, ticket counter. This system will generally be used in conjunction with an automated luggage conveyor system. This system provides means for an individual to place one or a stack of several totes onto the conveyor system which will automatically convey the totes to an endless storage conveyor. These storage conveyors will retain the totes in position for delivery to the ticket counters when the control system senses that the supply is either low or depleted. Once the control system receives a signal that a particular ticket counter requires additional totes the system will move a carrier into a position adjacent to the tote holders at such ticket counter and automatically dispense the totes. The attendants at the ticket counter are then able to readily access these totes. The system is equipped with a system of vertical and horizontal conveyor systems. The system further includes means for transferring totes from a vertical conveyor to a horizontal conveyor and vice versa. The system also includes branch conveyors located adjacent to the main conveyor for enabling the tote carriers to travel, and stop as necessary, in a position relative to the vertical conveyors such that the carrier can either place containers on or remove containers from the vertical conveyors. Also included in the system is a control system directing the totes from the manual load stations through to the ticket counter tote holders. This control scheme directs the totes by controlling the movements of the lifts, horizontal conveyors, transfer devices, and carriers.

Accordingly, it is an object of this invention to provide an automatic tote return system that can be utilized in facilities requiring the use of luggage totes on more than one floor.

It is another object of this invention to provide a tote return system of the above character wherein the delivery of the totes is automated so as to eliminate delays inherent in manual handling.

It is a further object of the invention to provide a substantially horizontal conveyor means capable of automatically placing and removing totes to and from a substantially vertical conveyor.

It is yet another object of the invention to provide a tote return system capable of moving totes in both the horizontal and vertical directions.

It is still another object of the invention to provide an automated tote return system of the above character wherein the totes are automatically delivered to check-in points as needed.

It is still a further object of the invention to provide a tote conveyor system wherein the totes are transferred onto carriers only once and not removed from such carriers until delivered to the point-of-use even if such final destination is located on a different floor then where the totes where placed onto such carriers.

These and other objects of the present invention will become readily apparent after studying and understanding the present invention, as hereinafter described.

BRIEF DESCRIPTION OF DRAWINGS

FIG. 5 is a perspective and schematic view of the layout as depicted in FIGS. 1–3.

Figure 1:
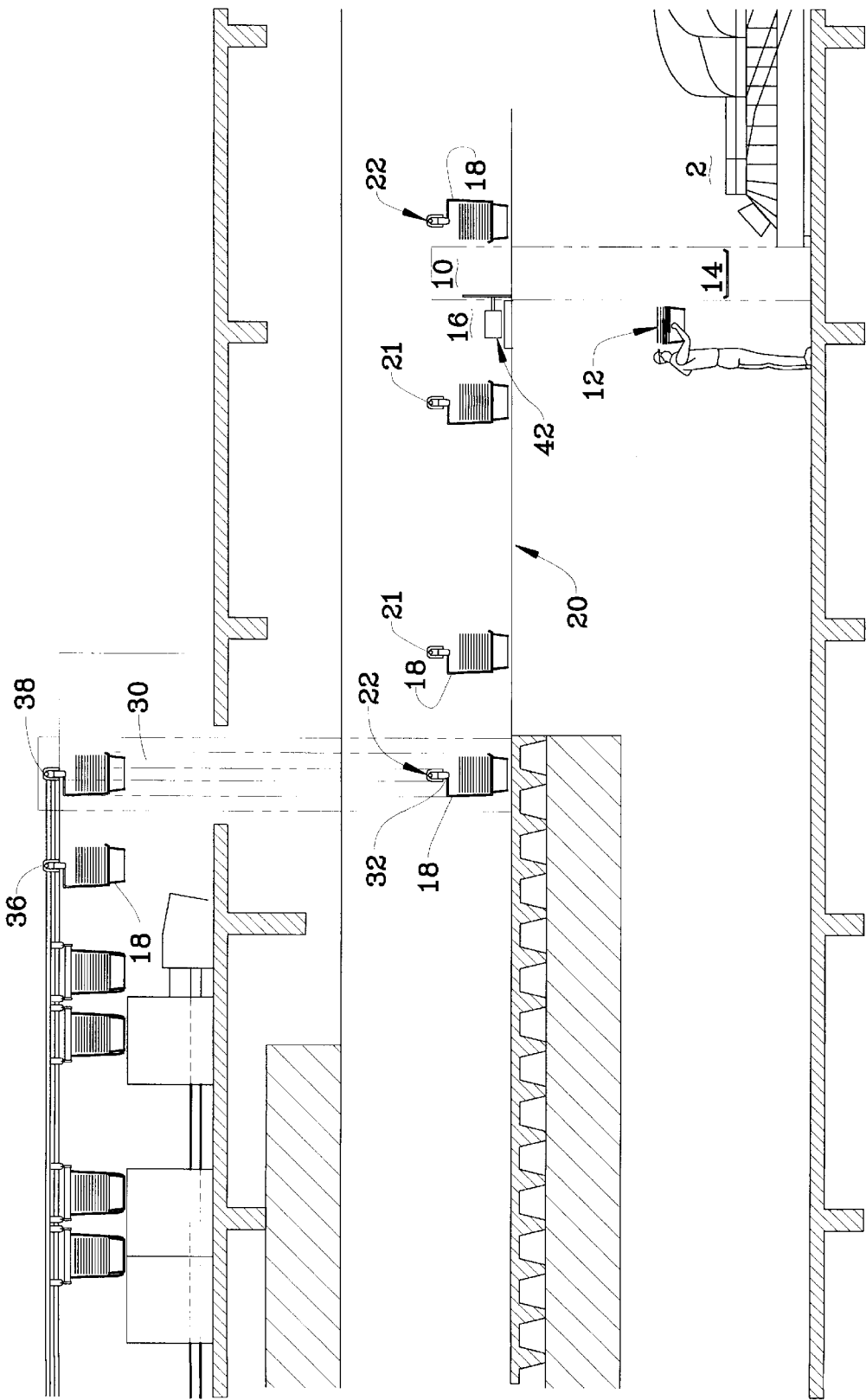
FIG. 1 is a side elevation view of one possible layout of a tote conveyor system as it might be utilized in a representative multi-floor facility.

Before the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The disclosure provides a tote conveyor system as may be utilized in an airport wherein luggage received at the customer check-in point, such as ticket counter 4, is placed into a tote and onto a conventional automatic conveyor system. This conveyor system delivers the tote containing the luggage to any one of a number of make-up points 2. The attendant retrieves the luggage, at the make-up point 2, and places it onto a conventional cart (not shown) for delivery to the plane. The tote is set off to the side to be stacked and/or placed onto the tote return system.

LIFT

Figure 2:
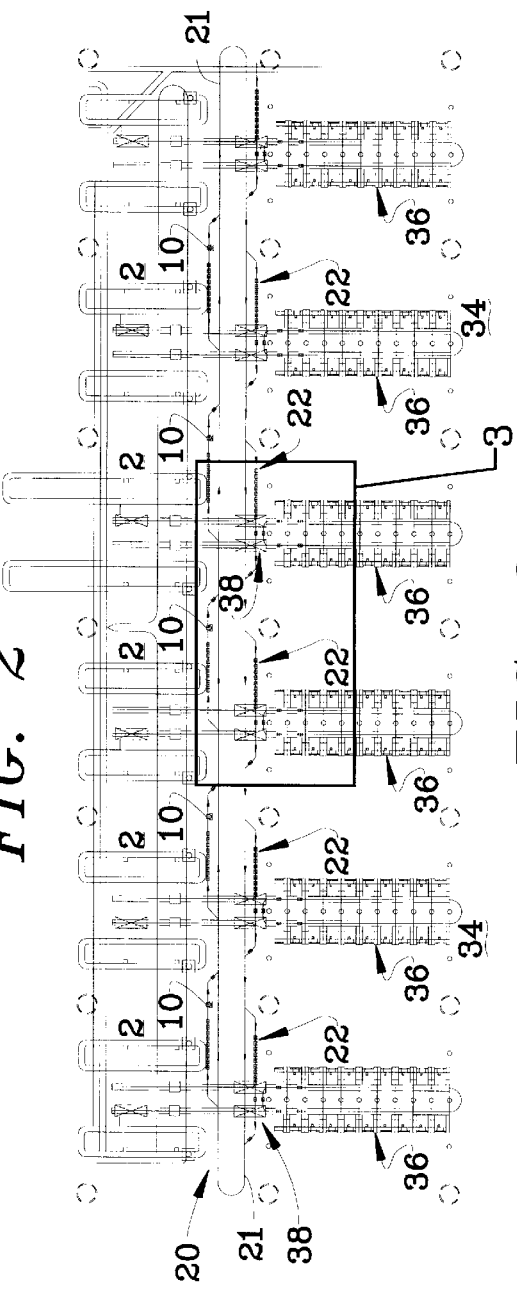
FIG. 2 is a schematic diagram plan view of one possible layout of a tote conveyor system.

The system in the form illustrated, in FIG. 1, has a lift 10. The lift may be any one of a wide variety of conventional elevating devices capable of transporting the totes in a more or less vertical direction. Preferably, this elevating device will be of a type occupying a minimal area of floor space such as a vertical four chain conveyor having chains attached to the four-corners of a vertically moving shelf capable of handling a tote or stack of totes 12. The totes are manually placed on the lift 10 either individually or preferably stacked at the manual loading station 14. Typically, the system will have several of these manual loading stations 14 and lifts 10 conveniently disposed about the facility adjacent to the cargo make-up areas 2 as seen in FIG. 2. It should be appreciated that the system may comprise a substantially horizontal conveyor system having manual loading stations for collecting totes for automatic transfer to a lift. The lift conveys the totes in a substantially vertical direction to the transfer station 16, the point where the lift intersects with a loading branch 22 of the substantially horizontal central conveyor system 20.

CENTRAL CONVEYOR

The central conveyor system 20 may be of any type known in the industry suitable for transporting totes. Typically, the overhead conveyors will be a powered chain and track system. The central conveyor may comprise a recirculating conveyor 21, one or more branch conveyors 22 and multiple carriers 18. The branch conveyors 22 are typically conveyors that on one end receive carriers from the recirculating conveyor 21 and on the other end return carriers to the recirculating conveyor 21. The carriers may be of any type suitable for this purpose such as frames extending down from conveyor track engagement means wherein such frame is adapted to hold the totes 12 while remaining open on one side. The engagement means is capable of engaging and disengaging from the conveyor and may be of any type suitable for this purpose such as mechanically or electrically activated jaw, dog, latch or catch. Although this central conveyor 20 is substantially horizontal, it will be appreciated that portions of this conveyor may be directed upwardly and/or downwardly enabling the carriers 18 to be carried to and from different elevations. This central conveyor system 20 may additionally comprise a series of switches 24 and triggers. The switches 24 enable the carriers 18 to move to and from one conveyor track to another, such as a branch conveyor. The triggers, which may be mechanical, electrical, or electromechanical, are used for activating the engagement means on the carriers. The central conveyor system 20 is a means for distributing the totes 12 collected from the lifts 10 to other lifts 10 or 30 for further transporting or directly to the tote holders 6.

Alternatively, the central convey system may incorporate another substantially horizontal conveyor or series of conveyors 34, typically, on another level. These additional conveyors may be composed of at least one recirculating conveyor 36, having at least one branch conveyor 38 for addressing at least one lift 30. These conveyors can then transport the tote carriers 18 and totes 12 to and from the individual ticket counters 4 such that totes 12 can be delivered to the tote holders 6 typically positioned at the ticket counters.

CARRIER LIFT

The tote conveyor system may also include a carrier lift 30 which is capable of vertically conveying carriers 18 including carriers holding totes. The carrier lift 30 may be of any type of lift or elevating means suitable for this purpose and may be of the same type or even the same lift as that described above. Typically, a carrier lift will be equipped with a means 32 for securing the carrier in a manner similar to that of the central conveyor system. This may include a section of a conveyor of the same type as the central conveyor system. For instance if the central conveyor system was of the chain and track type described above the carrier lift may have a section of track capable of securing the carrier during the vertical movements and adapted for transfer operations of the carrier to and from the lift 30.

TRANSFER DEVICES

The system will typically include a transfer means at each point throughout the system where it is necessary to transfer the totes and/or carriers from a lift to a conveyor, from a conveyor to a lift, and/or from a lift and/or conveyor to a tote holder. The transfer means may be of any type suitable for this purpose such as pushers, pullers, slides, tilters and combinations of these. A typical transfer device may be a pusher type 42 where a flatface ram, positioned on the opposite side of the lift from the carrier, is extended by a power source engaging a side of the tote and forcing the tote off the lift and into the carrier. Alternatively, the ram may be positioned behind the carrier opposite the destination point, for instance the tote holder, such that the totes could be pushed off the carrier and presented to the destination point. The power source may be any source known for this purpose. Typically, the ram will be electro-mechanically and/or hydraulically operated. Another typical transfer device may be an in-line conveyor type 44 in which the carrier is conveyed in close proximity to the lift and allowed to move freely along a track into the lift securing means. The carrier, once transported by the lift to its destination, may freely move from the securing means along a track off the lift to another conveyor system. The carrier transfer between the conveyor system and the lift carrier may be accomplished by designing the conveyor track employed for delivering the carrier to the lift at an elevation higher than the position of the securing means fixed on the lift such that the transfer may at least in-part be assisted by gravity. Similarly, the conveyor track employed for receiving the carrier from the lift may be positioned at an elevation lower than the position of the securing means fixed to the lift. The carrier securing means positioned on the lift may be of any type suitable for this purpose such as a single section of conveyor track or a more elaborate system composed of moving components for securing the carrier during transport and assisting the transfer of the carrier to and from the conveyors.

CONTROL SYSTEM

It will be readily apparent that in the more advanced forms of this invention, it will be necessary to utilize a mechanism to keep track of the movements of the totes through the system. This can be accomplished in a number of ways, the one described herein utilizing a computer processor system.

The system may comprise a single computer which receives all the signals from the sensors or a master control computer that receives data from satellite computers. The location and identity of the totes may be maintained by a system of sensing elements including mechanical switches, electromechanical switches, manual switches, optical sensors, and combinations of these and others. The computer responds to these various input sensors by sending output signals to various activators including switches, triggers, motors, pushers and a variety of elements known to be controlled by computer control systems.

The control system may cause: a lift to move to particular position and stop, a carrier to travel about the conveyor system through a series of switches and disengage from the conveyor to a particular position and stop, or any number of a series of operations required to enable the totes to be conveyed throughout the tote conveyor system.

It should be appreciated that the invention may exist in an infinite number of arrangements. The system should be arranged in accordance to the facility in which it is intended to serve. The system may contain any number or none of any particular component noted above. The system may also combine any number of other components along with the components above.

SIMPLIFIED SYSTEM

A simplified system of the present invention will include at least one lift, at least one substantially horizontal conveyor system, at least one transfer means, at least one tote loading station and at least one tote holder. The system may include varying levels and degrees of control from substantially manual control through to complete automation.

EXAMPLE

Figure 3:
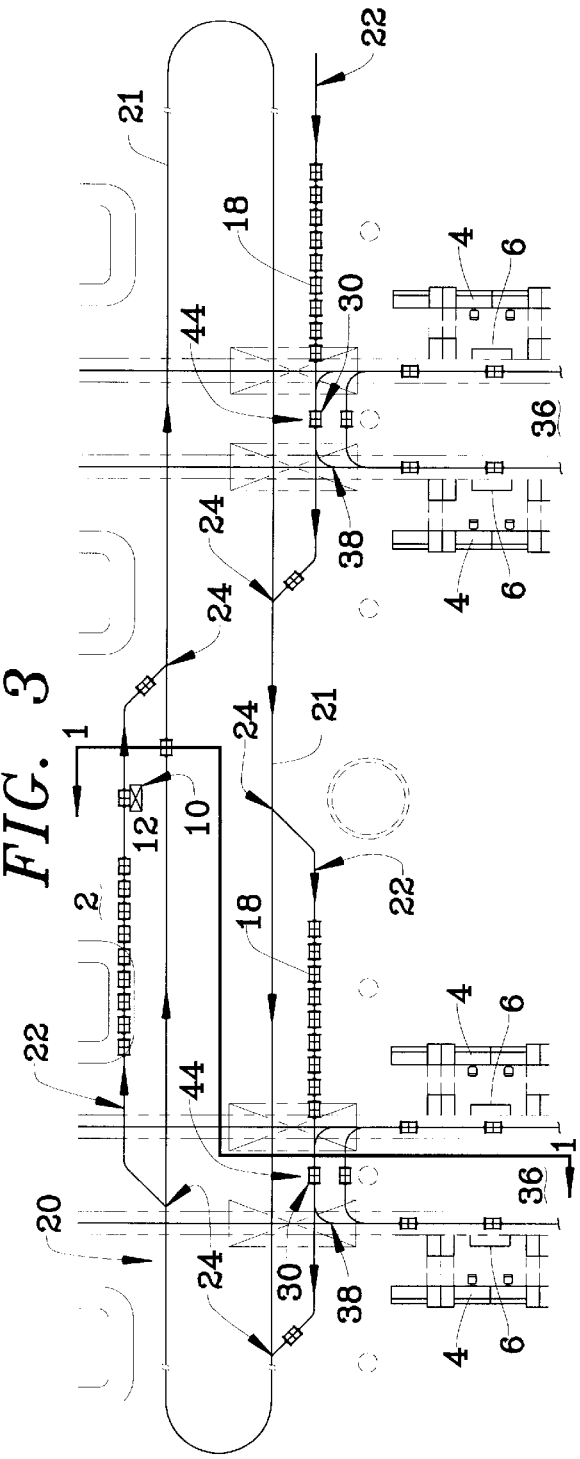
FIG. 3 is an enlarged plan view of section III-III of FIG. 2.
Figure 4:
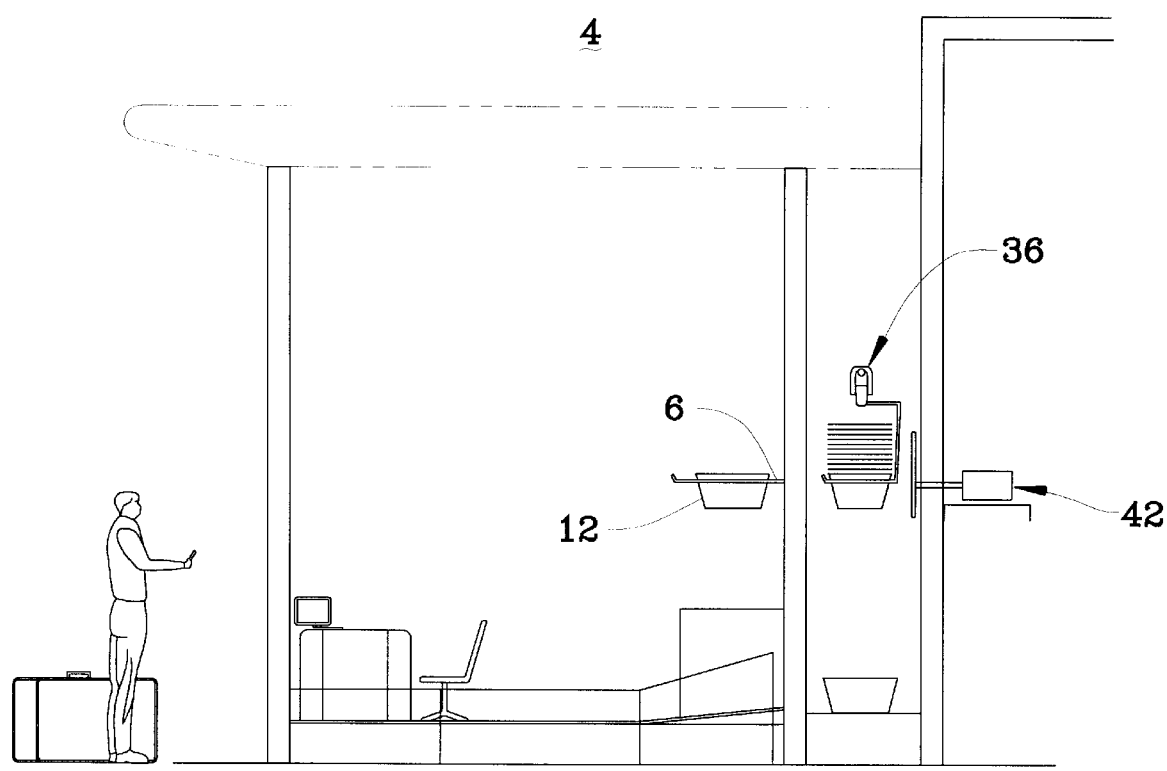
FIG. 4 is a side elevation view of a ticket counter showing the tote conveyor system.

The invention may be practiced as follows. As best seen in FIGS. 1 and 5 the system operates on three levels, all of which can be seen in FIGS. 2 and 3. The lower level includes the make up areas 2 and the bottom portions of lifts 10; the middle level includes the central recirculating conveyor 21, branch conveyors 22, the top ends of lifts 10, and the bottom ends of lifts 30; the upper level includes the ticket counters 4, recirculating conveyors 36, and the top ends of lifts 30. A tote conveyor system may have a series of tote lifts 30 positioned adjacent to the manual loading station 14 of each make up area 2 throughout the facility. The totes 12 may be manually placed either individually or in a stacked fashion onto the vertical tote lift 30 which will carry the totes up to a transfer station 16. The tote lift 10 will be of the type having a shelf positioned between and attached to four chains arranged at each of its corners. The chains and shelf will move in a continuous closed loop fashion such that the shelf will move up, over the top, down, around the bottom and up again. Once the vertically rising shelf containing the totes 12 reaches the transfer station 16 the tote lift 10 is stopped. The totes 12 are pushed off the tote lift 10 by a pusher 42 and onto a carrier 18 positioned adjacent to the lift 10. This carrier 18 will be on one of several branch lines 22 the are part of the central conveyor system 20.

The central conveyor system 20 will preferably be an overhead power and free continuous conveyor of the type supplied by Jervis B. Webb Company under the registered trademark Unibilt. The conveyor system will be composed of a central continuous recirculating conveyor 21 having several branch conveyors 22 for enabling the carriers 18 to address the transfer station 16 for each of the tote lifts 10 and carrier lifts 30. Once the carrier receives the totes, at the transfer station, from the tote lift 10 it will engage the chain of the branch conveyor 22 and travel along the conveyor track toward the recirculating conveyor 21. It will pass through a switching device 24 and engage the recirculating conveyor 21 of the central conveyor system 20. The carrier 18 will travel around the recirculating conveyor 21 until it reaches the branch conveyor 22 that addresses the designated carrier lift 30. The carrier will then switch from the central conveyor drive chain onto the branch conveyor drive chain. This branch conveyor will transport the carrier 18 up to the carrier lift transfer station. Once the carrier reaches this position the carrier can be disengaged from the branch conveyor power chain and travel downwardly onto the track mounted on the carrier lift 30.

The system may have a series of carrier lifts 30 positioned around the facility such that the tote conveyor system can address several groups of ticket counters 6. The carrier lift 30 will have a means of securing the carrier in the track mounted on the lift. And the carrier containing the totes will be transported up to another level of the facility. Once the carrier reaches the designated carrier lift transfer station on the ticket counter level of the facility the carrier will be released to travel along the track, typically downwardly, onto a branch line 38 of the upper level recirculating conveyor 36. The carrier will engage the branch line 38 of the upper level recirculating conveyor 36 and travel along the track toward the recirculating conveyor. Once it reaches the upper level recirculating conveyor 36 it will disengage the branch conveyor and engage the upper level recirculating conveyor. The carrier containing totes will enter a storage area where it will wait in a cue. This cue will be composed of carriers circulating on the upper level recirculating conveyor waiting to deliver their totes to a tote holder 6 positioned in proximity to the ticket counter 4. Once a request is made for more totes the carrier 18 will travel along the upper level recirculating conveyor 36 to a position adjacent to the tote holder 6. A pusher 42 will be activated to cause the totes 12 to be transferred from the carrier 18 to the tote holder 6.

The empty carrier 18 will begin its journey back to a tote lift transfer station. The carrier will travel along the upper level recirculating conveyor 36 onto its branch conveyor 38 onto the carrier lift 30 down to the central conveyor system level onto a branch conveyor 22 of the central conveyor system 20 to the recirculating conveyor 21 of the central conveyor system. Once on the recirculating conveyor of the central conveyor system it will circulate until a request is registered for a carrier to be positioned at a tote lift transfer station. In order to respond to the request, the carrier will move along the recirculating conveyor 21 until it reaches the switch 24 for the desired branch conveyor. The carrier will transfer onto such branch conveyor and travel along the branch conveyor up to the requested tote lift transfer station 16. At this point the carrier will disengage the drive chain of the branch conveyor and wait to receive a tote or stack of totes 12 from the tote lift 10.

It has been found that it may be beneficial to incorporate a carrier lift into a tote convey system of this invention, as discussed in the Example. The use of a carrier lift can reduce the number of tote transfers to and from the carriers. Specifically, once the totes are loaded onto the carriers the carrier with totes can be transported around the system, both vertically and horizontally, which may reduce some of the complexities associated with these types of transfers.

What is claimed is:

1. A tote conveyor system comprising:
   manual loading means enabling an individual to place at least one tote onto said conveyor system;
   a first elevating means for moving at least one said tote in a substantially vertical direction between said manual loading means and a first conveyor;
   a second elevating means for moving at least one said tote in said substantially vertical direction between said first conveyor and a second conveyor;

at least one carrier means for releasably engaging at least one conveyor of said first or second conveyor and holding at least one tote;

said first conveyor being capable of transporting at least one said carrier means;

a first transfer means for moving at least one said tote between said first elevating means and said first conveyor;

said second conveyor being capable of transporting at least one said carrier means;

a second transfer means for transporting at least one said tote between said second elevating means and said second conveyor; and unloading means for discharging the second said tote from at least one conveyor of said first or second conveyor to a discharge station.

2. A tote conveyor system of claim 1 wherein said first conveyor comprises:

a recirculating conveyor for moving at least one said carrier means in a substantially horizontal direction; and at least one branch conveyor for transporting at least one said carrier means between said recirculating conveyor and a position in close proximity to at least one said elevating means; and said second conveyor comprises:

a recirculating conveyor for moving at least one said carrier means in a substantially horizontal direction; and at least one branch conveyor means for moving at least one said carrier means between said recirculating conveyor means and a position in close proximity to said second elevating means.

3. A tote conveyor system as in claim 2 wherein said first conveyor is at an elevation lower than said second conveyor.

4. A tote conveyor system comprising:

manual loading means enabling an individual to place at least one tote onto said conveyor system;

a tote elevating means for moving at least one said tote vertically between said manual loading means and a first transport means;

a carrier elevating means for moving at least one carrier means vertically between said first transport means and a second transport means;

at least one carrier means releasably engaging at least one transport means of said first or second transport means and holding at least one said tote;

said first transport means comprising:

a first conveyor means for moving at least one said carrier means in a substantially horizontal direction comprising an overhead endless conveyor; and, at least one branch conveyor means for transporting at least one said carrier means between said first conveyor means and said carrier elevating means;

at least one tote transfer means for moving at least one said tote between said tote elevating means and said first transport means;

said second transport means comprising:

a second conveyor means for moving at least one said carrier means in a substantially horizontal direction; and at least one branch conveyor means for transporting at least one said carrier means between said second conveyor means and said carrier elevating means;

unloading means for discharging at least one said tote from a carrier means to a discharge station; and controlling means for directing the movement of said totes and said carrier means about said conveyor system.

5. A tote conveyor system comprising:

first elevating means for moving at least one tote in a substantially vertical direction;

first conveying means including at least one carrier for moving said at least one tote in a substantially horizontal direction;

first transfer means for transferring said at least one tote from said first elevating means to said at least one carrier;

second elevating means for moving said at least one carrier in said substantially vertical direction;

second transfer means for transferring said at least one carrier from said first conveying means to said second elevating means;

second conveying means located at a different elevation than said first conveying means for moving said at least one carrier in a substantially horizontal direction; and, third transfer means for transferring said at least one carrier from said second elevating means to said second conveying means.

6. The tote conveying system of claim 5 wherein said first conveying means comprises:

a first branch section proximate to said first elevating means for holding said at least one carrier for receiving at least one tote from said first transfer means;

a second branch conveyor section proximate said second elevating means for presenting said tote-bearing carrier to said second elevating means; and, a third branch conveyor section proximate said second elevating means for receiving said empty carriers from said second elevating means.

7. A tote conveyor system according to claim 6 wherein said second conveying means includes an accumulator for accumulating tote-bearing carriers and wherein said system includes a rack for receiving totes and a fourth transfer means for transferring totes from said accumulated carriers to said rack.

8. A tote conveying system according to claim 7 including a controller for controlling said conveying means, said elevating means, and said transfer means.

* * * * *